March 31, 1970    W. C. MOORE ET AL    3,503,666
OPTICAL SCANNING DEVICE
Filed Feb. 27, 1968    2 Sheets-Sheet 2

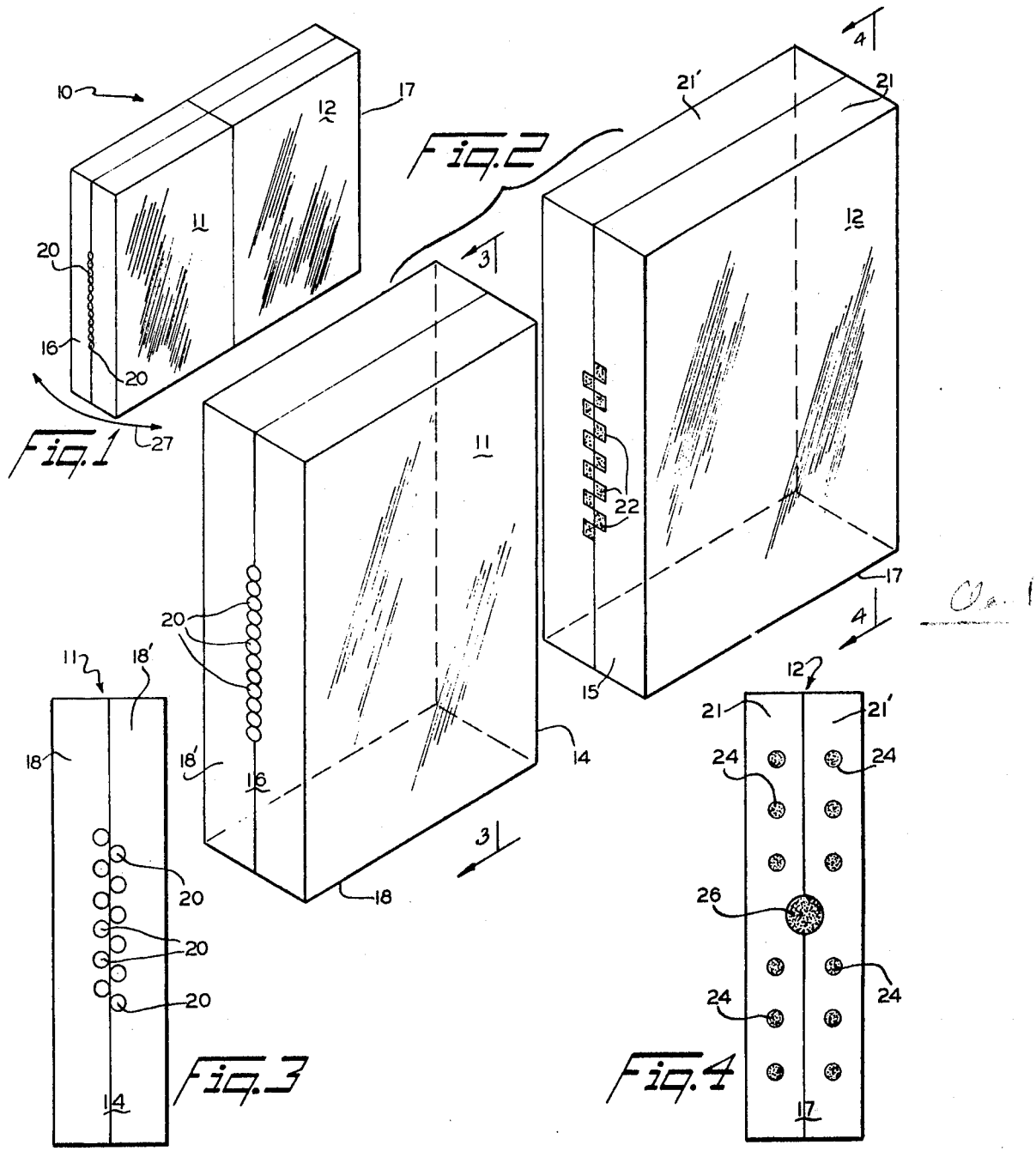
INVENTORS.
WILLIAM C. MOORE
BARDEN A. CONROE

INVENTORS.
WILLIAM C. MOORE
BARDEN A. CONROE
BY Bruns + Jenney
Attys.

United States Patent Office 3,503,666
Patented Mar. 31, 1970

3,503,666
OPTICAL SCANNING DEVICE
William C. Moore and Barden A. Conroe, Skaneateles, N.Y., assignors to Welch Allyn, Inc., Skaneateles Falls, N.Y.
Filed Feb. 27, 1968, Ser. No. 708,686
Int. Cl. G02b 5/16
U.S. Cl. 350—96      3 Claims

ABSTRACT OF THE DISCLOSURE

An optical scanning device in the form of a rectangular block having a plurality of light transmitting optical fiber bundles embedded therein. The device has a scanning end and a read-out end, and the bundles are arranged so that input light received by a single bundle at the read-out end is transmitted through the device and emitted by a row of bundles at the scanning end. The same bundles also receive the reflected light which is transmitted back through the device and emitted by corresponding bundles at the read-out end.

BACKGROUND OF THE INVENTION

This invention relates generally to scanning devices, and has particular reference to a compact optical scanning device which utilizes a novel arrangement of optical fibers.

While optical fibers have heretofore been employed in scanning apparatus of various types, most of the prior art devices are relatively complicated and expensive to produce. In addition, many known devices are quite cumbersome from a space standpoint and in many the fibers are not used in an efficient manner.

SUMMARY OF THE INVENTION

The scanning device of the invention is a composite article comprising a rectangular block of plastic material having embedded optical fiber bundles which extend from end to end of the block. At one end of the block, the scanning end, the bundle ends are collinear and contiguous and are adapted to both emit and receive light. In the interior of the block, each bundle is divided into two branches and one branch of each bundle forms the read-out means at the other end of the block. The other branches are all joined together to form a single, enlarged bundle for receiving light from a light source.

Because of its fiber bundle arrangement, the device disclosed herein adapts itself to a compact and simple form. Moreover, utilizing the same bundles (at the scanning end of the device) for transmitting light in both directions is an efficient use of the fibers. The simple form of the device together with its efficient use of fibers results in another advantage which is that the scanning device can be economically produced.

BRIEF DESCRIPTION OF THE DRAWINGS

FIGURE 1 is a perspective view of the scanning device of the invention;
FIGURE 2 is an enlarged, exploded perspective view of the device;
FIGURE 3 is an end elevation of one section of the device looking in the direction of arrows 3—3 in FIGURE 2;
FIGURE 4 is an end elevation of the other section of the device looking in the direction of arrows 4—4 in FIGURE 2.

DESCRIPTION OF THE PREFERRED EMBODIMENT

Figure 6:
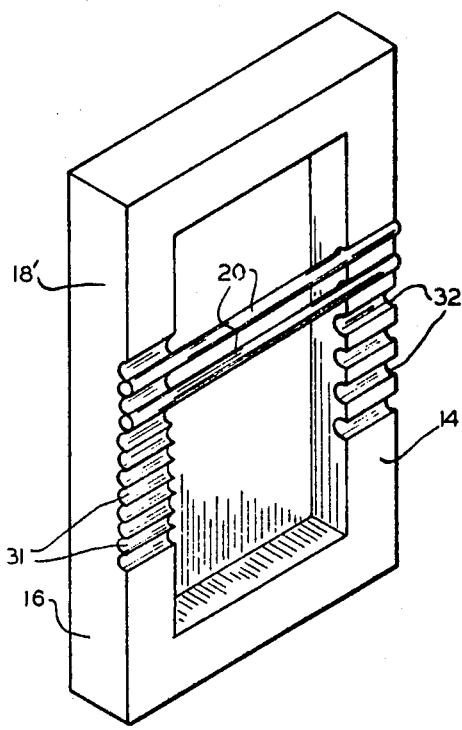
FIGURE 6 is a perspective view of the interior of a part of one of the sections of the device.

Having reference now to FIGURES 1 and 2 of the drawings, the scanning device of the invention is a somewhat elongated rectangular block indicated generally by the reference number 10 in FIGURE 1. Block 10 is comprised of two main sections 11 and 12 which are doweled or otherwise secured together in endwise relation with the end 14 of section 11 abutting against the end 15 of section 12. The opposite end 16 of section 11 is the scanning end of the device whereas the opposite end 17 of section 12 is the read-out end.

Section 11 is comprised of two parts or mating halves 18, 18' having grooves in their confronting surfaces for supporting a plurality of optical fiber bundles which extend longitudinally from end to end of the section as indicated, see FIGURES 2 and 3. In the embodiment shown, there are twelve such bundles in the form of clad optical fiber rods 20 which are single rods larger in diameter and substantially less flexible than conventional optical fibers, the rod diameter being in the order of .050". However, because bundles of optical fibers could be substituted for rods in the scanning device, the term "optical fiber bundles" as used herein is intended to include both bundles of fibers and single rods whenever the two can function in an equivalent manner.

At the scannig end 16 of the device, the ends of the rods 20 are colinear and contiguous, FIGURE 2. At the other end 14 of section 11 the rod ends are staggered as best shown in FIGURE 3.

Figure 7:
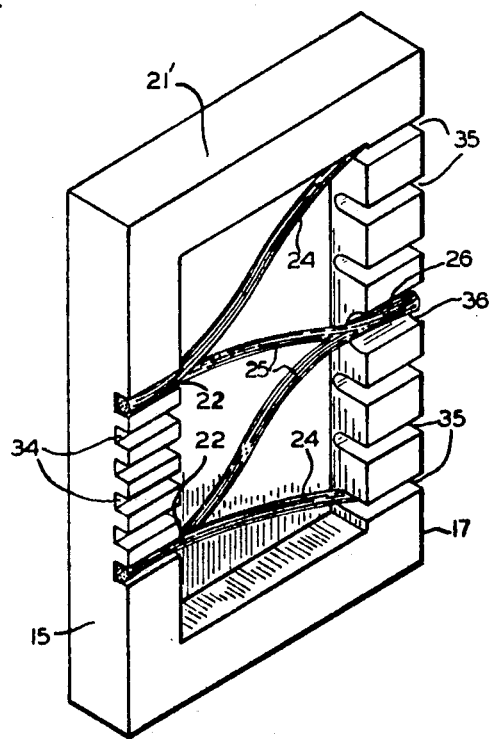
FIGURE 7 is a perspective view of the interior of a part of the other section of the device.

Like section 11, section 12 is comprised of two parts or mating halves 21, 21', and the confronting surfaces of these two parts are formed with grooves for supporting optical fiber bundles 22 which extend from end to end of the section as indicated in FIGURES 2 and 7. Each of the bundles 22 comprises a large number of fibers or filaments, and there are twelve such bundles in a staggered arrangement, FIGURE 2, so as to correspond exactly with the staggered arrangement of the rods 20 at the end 14 of section 11. Thus, when the sections 11 and 12 of the device are secured together, the respective rod ends and the ends of the bundles 22 are in registry with one another. Moreover, all of the ends are optically polished and in close physical contact with one another so that the bundles function as extensions to the rods, and vice versa, and light can be transmitted therebetween with negligible light loss.

Within the section 12, as will be explained further in connection with FIGURE 7, each of the bundles 22 is divided into two substantially equal parts or branches. One branch 24 of each bundle terminates at the read-out end 17 of the device and forms with a corresponding branch of every other bundle the read-out means, as will be described. As best shown in FIGURE 4, the ends of the branches 24 are spaced from one another in two rows of six each. The other branches 25 of bundles 22 are all joined together to form a single, enlarged bundle 26 which also terminates at the read-out end of the device at the approximate center thereof.

The end of bundle 26 is optically polished, as are the ends of all the bundles, and is adapted to receive light from a suitable light source such as a miniature lamp (not shown). This is the light input, and the light is transmitted through branches 25 and one-half of each bundle 22 and enters the rods 20 in registry with the ends of the bundles. The light is emitted from the ends of rods 20 at the scanning end 16 of the device, and any light that is reflected by the medium being scanned will re-enter the rods.

The assembled scanning device is adapted to be moved back and forth in a direction normal to the colinearly disposed rod ends, or in the direction of arrow 27 in FIGURE 1. As the device moves over printed material (or any other medium having contrasting light and dark areas such as a punch card), the light areas will reflect most of the light back into the rods 20 whereas the dark areas will reflect relatively little light.

The reflected light is transmitted back through the rods 20, and the light in any given rod enters the other half (the noninput light half) of the corresponding bundle 22 and is transmitted through the branch 24 of that bundle to the read-out end 17 of the device. At the same time, dark areas under any of the rod ends at the scanning end of the device will cause the ends of their corresponding branches 24 to be unlightened at the read-out end. Thus, at any given point in time, the light-dark pattern beneath the scanning end of the device is reproduced at the read-out end and can be sensed by light detectors of a known type (not shown), there being one such detector for each branch 24.

Figure 5:
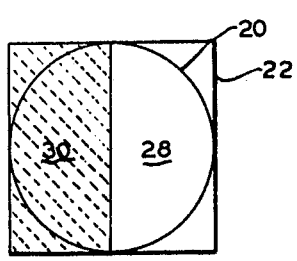
FIGURE 5 is a diagrammatic illustration of the abutting ends of the sections of one of the bundles.

The light transmission just described is diagrammatically illustrated by FIGURE 5 which shows the end of a rod 20 superimposed on the end of its corresponding bundle 22, this being an indication of the interface between the ends 14 and 15 of sections 11 and 12, respectively, in the assembled device. In the drawing, the right half 28 of the bundle transmits the input light (from bundle 26) to the rod while any reflected light passing back through the rod is transmitted to the left (cross hatched) half 30 of the bundle and from thence to the branch 24 forming a part of the read-out means.

FIGURES 6 and 7 illustrate one way in which the mating halves of sections 11 and 12 can be constructed to support the optical fiber bundles. Thus, in the embodiment shown, each half comprises a shallow box-like member having an arrangement of longitudinal grooves formed in the end walls of the box in its interior surface. In the half 18' of FIGURE 6, there are twelve contiguous semi-cylindrical grooves 31 at the end 16 of the section half and six spaced grooves 32 at the other end, the latter having a depth substantially equal to the diameter of a rod 20 and being spaced from one another by the same dimension.

The other half 18 of section 11 corresponds exactly to 18' at end 16 and has six spaced grooves at its other end in registry with the spaces between the grooves in half 18' whereby the two sets of grooves have a staggered arrangement which provides for the staggered arrangement of the rod ends shown in FIGURE 3. Two of the rods 20 are shown in position in the section half 18', and it will be understood that the alternate rods at the end 16 of the section will have their opposite ends disposed in the grooves at the other end of section 18. The rods can be secured at their ends only as by an epoxy cement or the like, or the entire box forming the section half can be filled with such a compound after the rods have been positioned therein.

The half 21' of section 12 shown in FIGURE 7 and its mating half 21 have the same box-like construction as the halves 18, 18'. At the end 15 of section 12, the half 21' has six longitudinal grooves 34 which register with the grooves 32 in section half 18'. These grooves support the bundles 22, two of which are shown. As previously noted, each bundle is divided into two branches 24 and 25, and the respective branches 24 are received in spaced, relatively deep grooves 35 at the opposite end of the section half to form one-half of the read-out means shown in FIGURE 4. The branches 25 are all joined together to form the single, enlarged bundle 26 and the latter is received in the central disposed semicylindrical groove 36 and forms the light input means for the device. The grooves 35, outwardly of bundles 24, will be filled with epoxy or the like, or the entire section half may be filled with such a compound after the bundles have been arranged therein.

While the invention has been described as employing a combination of glass rods and fiber bundles because this is convenient from a production standpoint, it should be understood that the bundles can extend continuously from the scanning end to the read-out end of the device with each bundle being divided at some point in between to form the light input bundle 26 and the read-out bundles 24 shown in FIGURE 4. Such a construction is contemplated by and within the scope of the invention.

From the foregoing description, it will be apparent that the invention provides a compact and efficient scanning device having a novel fiber bundle arrangement. As will be apparent to those familiar with the art, the invention may be embodied in other specific forms without departing from the spirit or essential characteristics thereof.

What is claimed is:

1. An optical scanning device comprising an elongated body member having a scanning end and a read-out end, a plurality of fiber optical rods disposed longitudinally within the body member with one end of each rod being substantially flush with the scanning end thereof, the ends of the rods at the scanning end of the body member having a colinear arrangement and the opposite ends of the rods having a staggered arrangement, and optical fiber bundles disposed longitudinally within the body member, said bundles being equal in number to said rods, each of the bundles being divided at a point between its ends into two separate branches, the undivided ends of the bundles respectively abutting against the staggered ends of the rods and the branches of the bundles terminating at the read-out end of the body member, one branch of each bundle being joined with one branch of every other bundle to form a single, enlarged bundle for receiving light from a light source.

2. A device as defined in claim 1 wherein the ends of the other branches of the bundles form the read-out means for the device, said branch ends being arranged to emit light reflected by the medium being scanned.

3. A device as defined in claim 2 wherein adjacent rod ends at the scanning end of the body member are in contact with one another and the ends of said branches forming the read-out means are spaced from one another.

References Cited

UNITED STATES PATENTS 3,192,843 7/1965 Kapany et al. ------ 350—96 X
3,384,755 5/1968 Williamson et al. --- 350—96 X

OTHER REFERENCES

Sokolski: "Fiber Optic Read Head," article in IBM Technical Disclosure Bulletin, vol. 8, No. 6, November 1965, pp. 879 and 880 cited.

DAVID H. RUBIN, Primary Examiner

U.S. Cl. X.R.

250—227